United States Patent
Kim et al.

(10) Patent No.: US 8,335,155 B2
(45) Date of Patent: Dec. 18, 2012

(54) PACKET TRANSMISSION METHOD FOR WIRELESS PERSONAL AREA NETWORK

(75) Inventors: Eui Jik Kim, Suwon-si (KR); Sun Gi Kim, Seoul (KR); Hyo Hyun Choi, Seoul (KR); Jeong Geun Kim, Yongin-si (KR)

(73) Assignee: Samsung Electronics Co., Ltd., Samsung-ro, Yeongtong-gu, Swuon-si, Gyeonggi-do (KR)

( * ) Notice: Subject to any disclaimer, the term of this patent is extended or adjusted under 35 U.S.C. 154(b) by 610 days.

(21) Appl. No.: 12/334,706

(22) Filed: Dec. 15, 2008

(65) Prior Publication Data

US 2009/0154438 A1    Jun. 18, 2009

(30) Foreign Application Priority Data

Dec. 13, 2007    (KR) ................. 10-2007-0129879

(51) Int. Cl.
*G01R 31/08* (2006.01)
(52) U.S. Cl. .......................................... 370/229
(58) Field of Classification Search ............. 370/442, 370/448, 230, 468, 310, 310.2, 321, 329, 370/338, 389, 328, 229, 235, 252, 376, 232
See application file for complete search history.

(56) References Cited

U.S. PATENT DOCUMENTS

| | | | |
|---|---|---|---|
| RE36,353 E * | 10/1999 | Yang et al. | 370/448 |
| 7,292,598 B2 * | 11/2007 | Ho et al. | 370/461 |
| 2006/0034208 A1 * | 2/2006 | Blouin | 370/328 |
| 2007/0070902 A1 * | 3/2007 | Elaoud et al. | 370/231 |
| 2007/0081490 A1 * | 4/2007 | Kim et al. | 370/329 |
| 2008/0107128 A1 * | 5/2008 | Lo et al. | 370/448 |
| 2009/0067389 A1 * | 3/2009 | Lee et al. | 370/336 |
| 2010/0135319 A1 * | 6/2010 | Wang et al. | 370/445 |

* cited by examiner

*Primary Examiner* — Kwang B Yao
*Assistant Examiner* — Anh Ngoc Nguyen
(74) *Attorney, Agent, or Firm* — Cha & Reiter, LLC

(57) ABSTRACT

A packet transmission method for a WPAN that for alleviating traffic concentration in an active period and improving network throughput by controlling packet transmission timing in the active period. A packet transmission method for a wireless personal area network including a coordinator operating with a specific duty cycle and a plurality of devices includes determining, when a packet is generated, whether there is another packet waiting to be sent; determining, if there is no other packet waiting to be sent, whether the network is in an inactive period; setting, when network is in an inactive period, a backoff time; and sending the packet when the backoff time has expired. The packet transmission method controls an initial backoff value adaptively to a duty cycle of the network.

13 Claims, 9 Drawing Sheets

PACKET TRANSMISSION METHOD FOR WIRELESS PERSONAL AREA NETWORK

CLAIM OF PRIORITY

This application claims priority from an application entitled "PACKET TRANSMISSION METHOD FOR WIRELESS PERSONAL AREA NETWORK" filed in the Korean Intellectual Property Office on Dec. 13, 2007 and assigned Serial No. 2007-0129879, the contents of which are incorporated herein by reference in its entirety.

BACKGROUND OF THE INVENTION

1. Field of the Invention

The present invention relates to a wireless personal area network (WPAN). More particularly, the present invention relates to a packet transmission method for a WPAN that alleviates traffic concentration in an active period and improving network throughput.

2. Description of the Related Art

Recently, computer networks have been evolving to support various information processing devices. With the advance in network technologies, wireless networks are replacing conventional wired networks. These wireless networks are advantageous in mobility and eliminate the need for extensive cabling and patching. Wireless networking technologies can be classified into Wireless Local Area Network (WLAN) technologies supporting wireless connections in the range of 50~100 m and Wireless Personal Area Network (WPAN) technologies supporting wireless connections up to 10 m. However, when considering a home network for interconnecting the electric appliances, WPAN technologies are suitable in view of ad hoc networking capability.

In such a wireless network, a network coordinator manages other devices. Moreover, there is a plurality of network coordinator-based WPAN standards developed by IEEE 802.15 Working Group.

In such a WPAN environment, the network nodes including a network coordinator and other devices often operate with battery power, meaning that low power consumption is one of the most important design constraints. High energy efficiency can be achieved with a low duty cycle (a ratio of active period to entire period) operation. There is a research showing that it is required to set the duty cycle of a network device to below 1% in order to use a battery having the most popular capacity for 2 years.

In the meantime, IEEE 802.15.4 intends to offer a Low Rate WPAN (LR-WPAN) which focuses on low cost, low speed ubiquitous communication between devices. The IEEE 802.15.4 task group (ZigBee®) deals with low data rate but long battery life and very low complexity for use in applications such as wireless remote controller, electric appliance controller, building control, toy, and the like. In 2003, the standardization of the physical (PHY) layer and medium access control (MAC) layer has been completed. The data rate is 250 kbps at 2.4 GHz (16 channels), 40 kbps at 915 MHz (10 channels), and 20 kbps at 868 MHz (1 channel) with connection range of 1~100 m.

As mentioned above, the IEEE 802.15.4 WPAN operates at a low duty cycle for minimizing power consumption. However, the low duty cycle based operation causes some problems.

FIG. 1A is a diagram illustrating a traffic distribution of a conventional IEEE 802.15.4 WPAN operating with a medium duty cycle, and FIG. 1B is a conventional diagram a traffic distribution of an IEEE 802.15.4 WPAN operating with a low duty cycle.

As shown in FIGS. 1A and 1B, as the duty cycle decreases, a number of devices preparing transmission of packets increases during the inactive period (identified by the dashed circles) such that the more packets are attempted to be transmitted in the next active period. In the conventional packet transmission method, the devices content with a fixed initial backoff value without consideration of whether the packets are generated in the active or inactive period. This causes traffic concentration in the active period and, in turn, increases packet collision probability and packet loss.

SUMMARY OF THE INVENTION

The present invention provides a packet transmission method that is capable of alleviating traffic concentration in a wireless personal area network (WPAN) operating with a low duty cycle.

The present invention also provides a method for packet transmission method for a WPAN that is capable of reducing packet collision probability by setting backoff times of mobile nodes using a duty cycle reduction function of the WPAN.

Additionally, the present invention provides a packet transmission method for a WPAN that is capable of minimizing packet collision probability by configuring a start time of backoff of a packet that is generated during an inactive period, by dividing an active period into n slots and allocating a slot randomly selected in uniform distribution of (0, n−1) to the slot.

In accordance with an exemplary embodiment of the present invention, a packet transmission method for a wireless personal area network having a coordinator operating with a specific duty cycle and a plurality of devices, includes the steps of determining, when a packet is generated, whether there is another packet waiting to be sent; determining, if there is no other packet waiting to be sent, whether the network is in an inactive period; setting, when network is in an inactive period, a backoff time; and sending the packet when the backoff time has expired.

In accordance with an exemplary embodiment of the present invention, a packet transmission method for a wireless personal area network having a coordinator operating with a specific duty cycle and a plurality of devices, includes the steps of determining, when a packet is generated upon start of an active period, whether there is another packet waiting to be sent; selecting, if there is another packet waiting to be sent, one of n slots constituting the active period in uniform distribution of (0, n−1); and setting a start time of the selected slot as backoff start time.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1A:
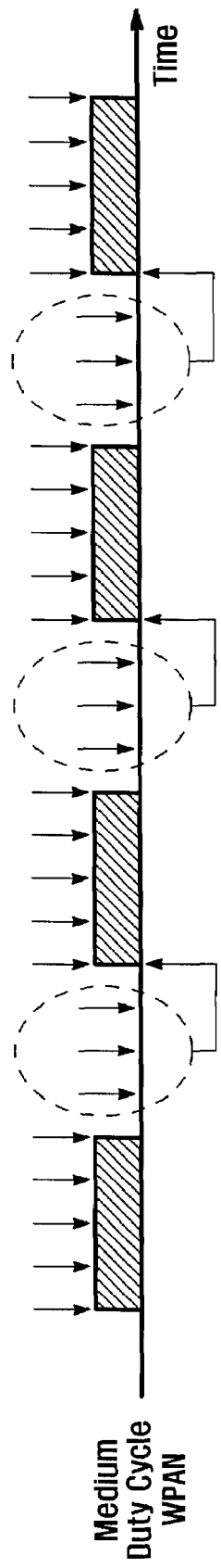
FIG. 1A is a diagram illustrating conventional traffic distribution of an IEEE 802.15.4 WPAN operating with a medium duty cycle.
Figure 1B:
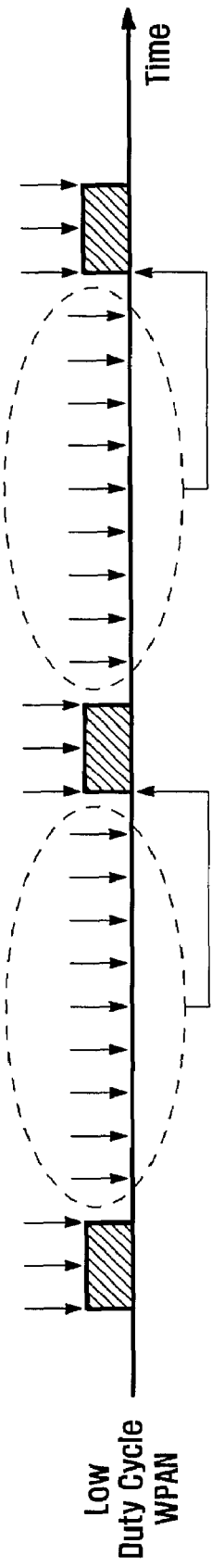
FIG. 1B is a diagram illustrating conventional traffic distribution of an IEEE 802.15.4 WPAN operating with a low duty cycle.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. In the drawings, certain elements may be exaggerated or omitted or schematically depicted so as not to obscure appreciation of the invention by a person of ordinary skill in the art.

Figure 2:
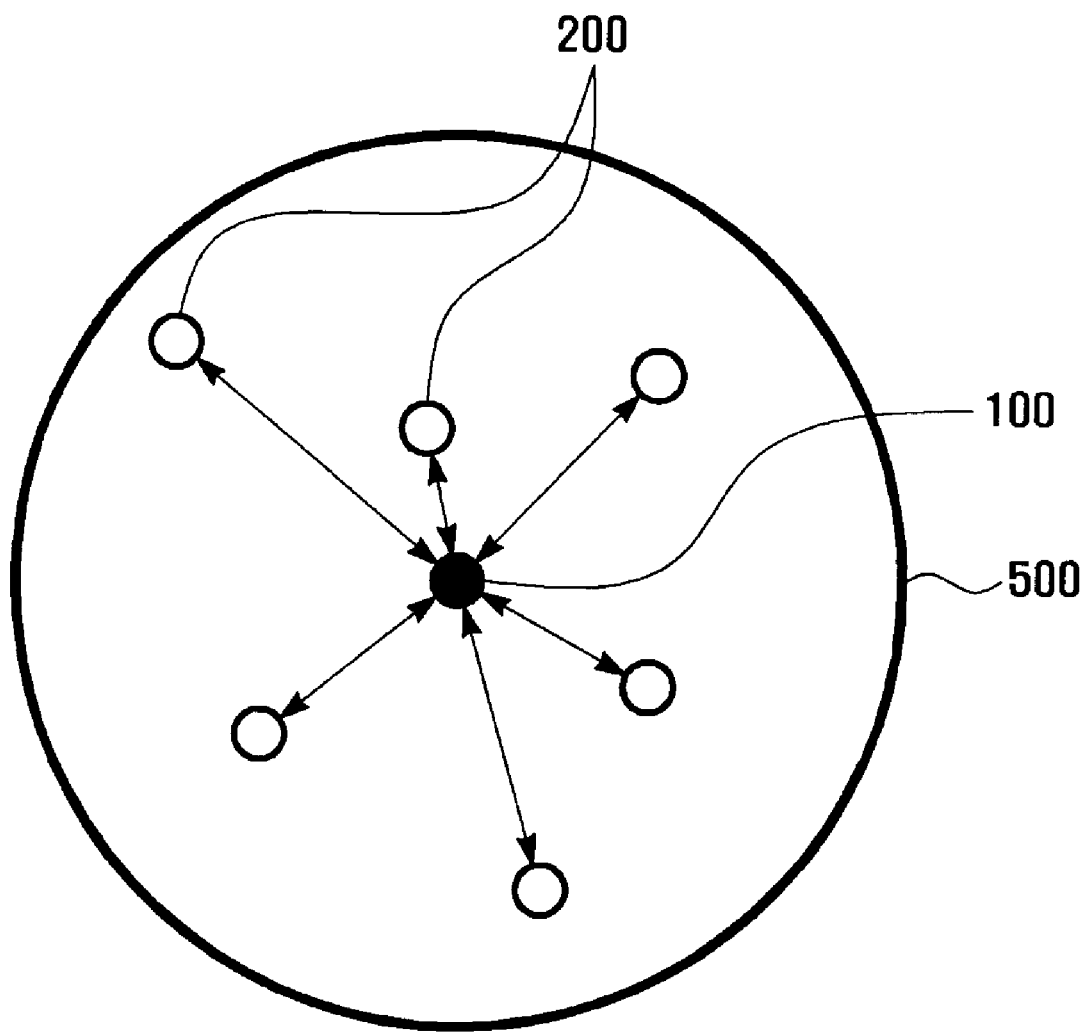
FIG. 2 is a conceptual diagram illustrating a WPAN according to an exemplary embodiment of the present invention.

FIG. 2 is a conceptual diagram illustrating a WPAN according to an exemplary embodiment of the present invention.

Referring to FIG. 2, the WPAN 500 includes a network coordinator 100 and a plurality of network devices 200.

The WPAN 500 is configured with a network device acting as a coordinator that controls network formation and operation. In a case where more than one personal area network is deployed in an area, these personal area networks are identified by unique network identity information. The wireless personal area network can be implemented with, for example IEEE standards such as Bluetooth (IEEE 802.15.1), Ultra Wideband (UWB, IEEE 802.15.3), and ZigBee (IEEE 802.15.4), and other or non-standard network operations as well. In this exemplary embodiment, the packet transmission method is described in association with an IEEE 802.15.4 standard based wireless personal area network 500. However, the present invention is not limited to the IEEE 802.15.4 network.

The network coordinator 100 may comprise a dedicated device, or one of the network devices selected for performing coordinator functions. The network coordinator 100 is responsible for performing critical functions such as starting the network, assigning device addresses, and exchanging control information with other network device for communication. The network devices 200 can communicate with each other via the network coordinator 100.

The network coordinator 100 and the network devices 200 may operate with active and inactive modes. In order to conserve energy, the network devices are activated for transmitting and receiving packets in the active period and then enter inactive periods. This slotted structure is available when the traffic amount is small and the traffic is not delay sensitive.

In addition, the network coordinator 100 and the network devices 200 wake up to transmit and receive packets in the active period and then enter sleep mode in the inactive mode. Each network device 200 alternates between the wakeup and sleep modes either periodically and/or irregularly.

If the active period starts, the network device 200 having packets to be transmitted sets a backoff value, i.e. packet transmission timing, for avoiding collision. The backoff value is set by dividing the active period into a plurality of timeslots and selecting a timeslot using a duty cycle reduction function. The backoff mechanism is used for alleviating collision probability of the packets in the contention period. Using the backoff mechanism, the network devices 200 can transmit their packets effectively without collision.

Figure 3:
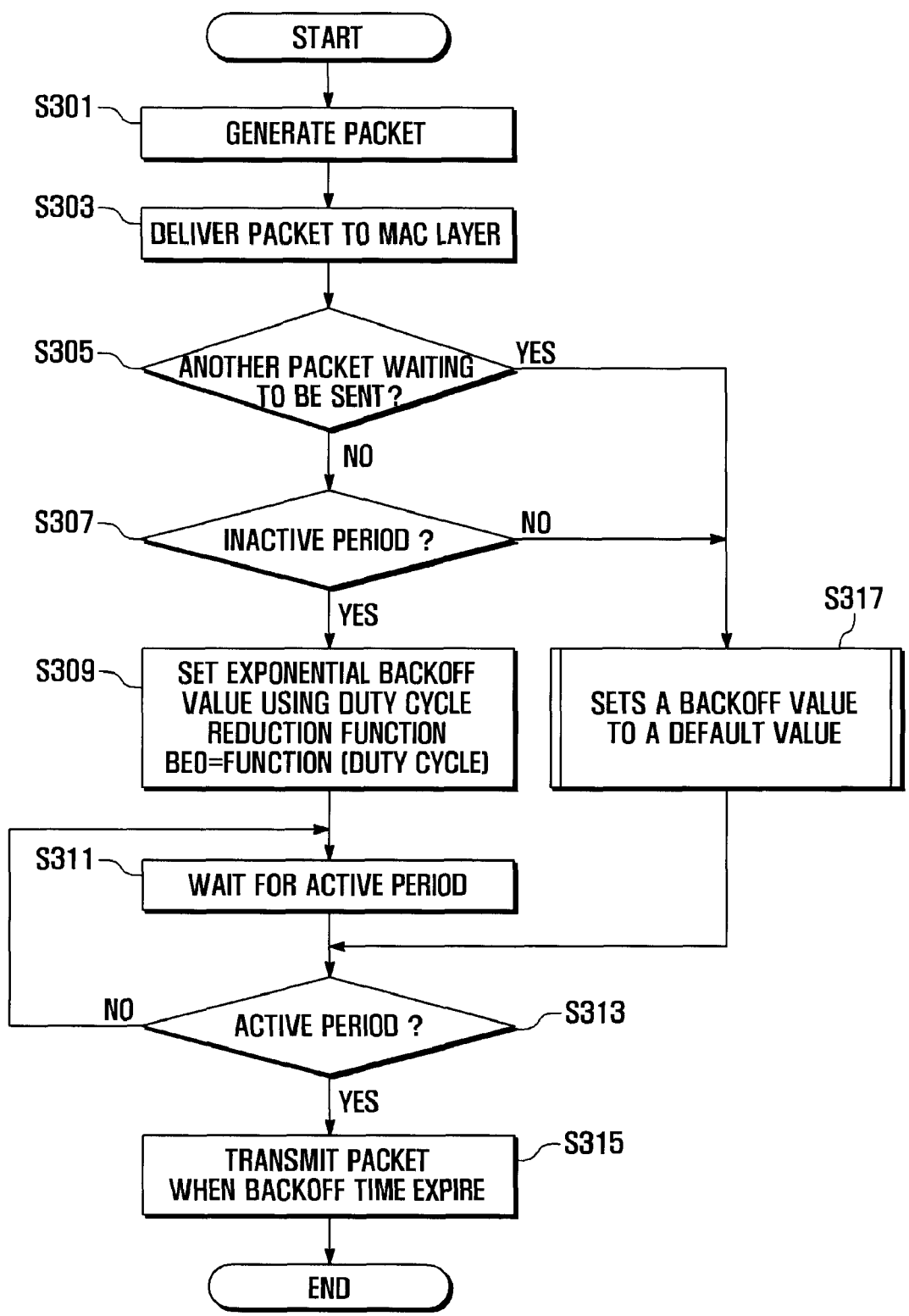
FIG. 3 is a flowchart illustrating a packet transmission method for a WPAN according to an exemplary embodiment of the present invention.

FIG. 3 is a flowchart illustrating a packet transmission method for a WPAN according to an exemplary embodiment of the present invention.

Referring to FIG. 3, in the packet transmission method according to this exemplary embodiment, a packet is generated at an upper layer of a network device 200 (S301) and then delivered to a medium access control (MAC) layer (S303). Typically, a WPAN protocol stack is provided with a layered set of a physical layer, a MAC layer, a network layer, and an application layer.

The physical layer is a layer for providing a medium for transferring data. The physical layer is responsible for establishing, maintaining, and releasing a physical connection. The MAC layer is responsible for delivering data and error control such that the physical medium is shared for transmitting with collision. The MAC layer is also responsible for framing, link access, reliable data transmission, flow control, network topology management, and error detection and correction. The network layer is responsible for initiating a network, addressing network devices, routing data from a source to a destination, maintaining routes between network devices, managing frame security. The application layer is responsible for providing an interface with users through applications.

After the packet is delivered to the MAC layer, the network device 200 determines whether there is another packet waiting to be sent (S305). In the wireless personal area network one channel and one ID is used. That is, one ID is used for a channel. At step S305, the mobile device checks whether more than one ID is being used. If it is informed that there is another packet waiting to be sent, the network device 200 sets a backoff value to a default value (S317). The procedure of setting a backoff value to a default value in S317 is described later in more detail later with reference to FIG. 5.

If there is no other packet waiting to be sent at step S305, the network device 200 determines whether the network is in the inactive period (S307). As mentioned above, the network device 200 can transmits packets when the network is in the active period. If the network is in the active period, the network device 200 sets its backoff value with the default value (S317).

If the network is in the inactive period, the network device 200 sets its backoff value using a duty cycle reduction function (S309). In other words, the network device 200 sets the exponential backoff value using the function BEO=function (duty cycle). The duty cycle reduction function is described with reference to FIG. 4.

Figure 4:
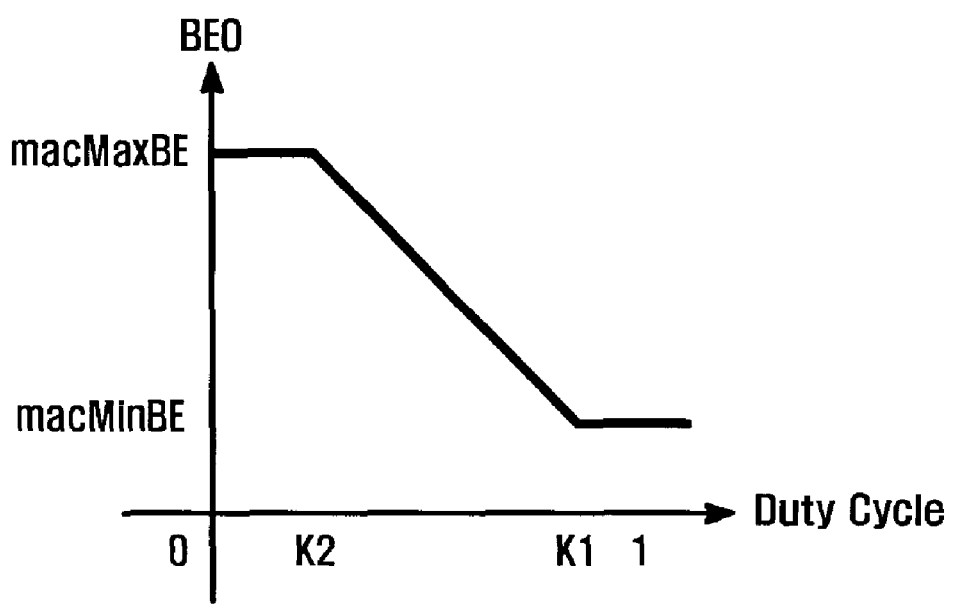
FIG. 4 is a graph illustrating a duty cycle reduction function for used in the packet transmission method according to an exemplary embodiment of the present invention.

FIG. 4 is a graph illustrating a duty cycle reduction function for used in the packet transmission method according to an exemplary embodiment of the present invention.

Referring to FIG. 4, the exponential backoff value (BE) is determined between a minimum value macMinBE and a maximum value macMaxBE. The exponential backoff value is set to be greater than the default backoff value. The exponential backoff value increments as the duty cycle decreases. The minimum value macMinBE is set to be an exponential backoff value (BE) as described hereinbelow. The value 1 on the duty cycle axis means 100% of duty cycle, i.e. no inactive period. The initial backoff value (BE0) varies in the linear function as the duty cycle changes.

Referring to the example in FIG. 4, the exponential backoff value is determined as the following function under the conditions of k2=0.005, k1=1, macMinBE=3, and macMinBe=8:

$$2^{BE0} = \begin{cases} 8, & \alpha = 1 \\ \{-249.25\alpha + 257.25\}, & 0.005 \leq \alpha \leq 1 \\ 256, & 0 \leq \alpha \leq 0.005 \end{cases}$$

After setting the exponential backoff value using the duty cycle reduction function (at step S309 in FIG. 3), the network device 200 waits for the start of the active period (S311). Next, the network device 200 determines whether the active period starts (S313). That is, the network device 200 backs off on the basis of the exponential backoff value set at step S309 or S317, and then transmits the packet when the backoff has expired S315.

Now the default backoff procedure is described with reference to FIG. 5.

Figure 5:
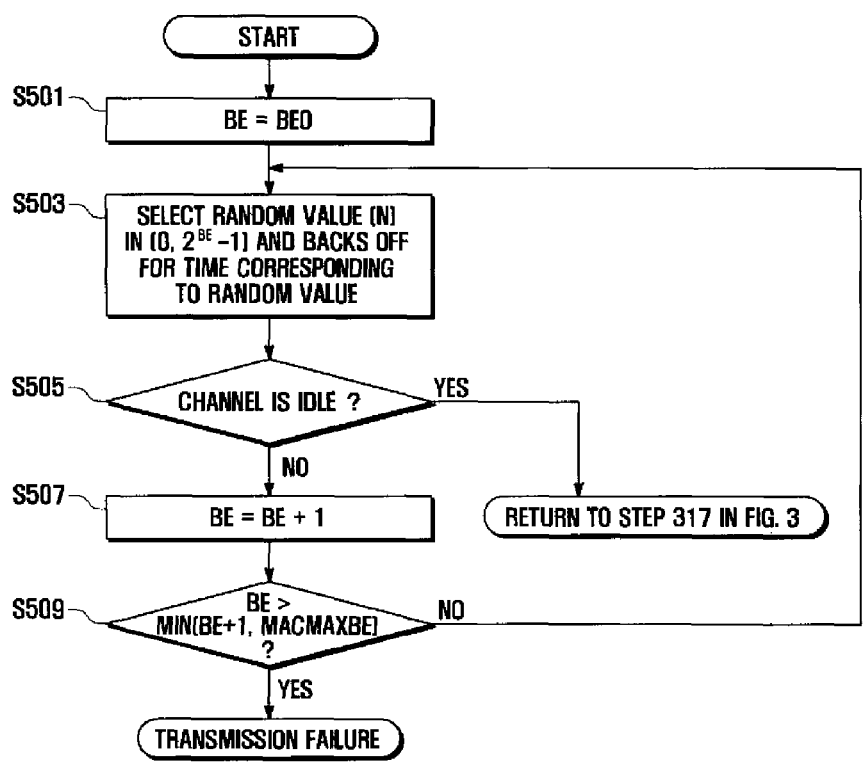
FIG. 5 is a flowchart illustrating an example of the default backoff procedure (S317) of FIG. 3.

FIG. 5 is a flowchart illustrating an example of the default backoff procedure (S317) of FIG. 3. In this exemplary embodiment, the default backoff procedure is performed using a binary exponential backoff algorithm.

Referring to FIG. 5, the network device 200 sets a backoff to an initial exponential backoff value, i.e. BE=BE0 (S501).

Next, the network device 200 selects a random value (N) in uniform distribution of (0, $2^{BE}-1$) and backs off during the backoff time indicated by N (S503).

When the backoff time has expired, the network device 200 determines whether the channel is idle (S505). If the channel is idle, the network device 200 returns to the output of step 317 of FIG. 3 and, otherwise, increases the BE by 1, i.e. BE=BE+1 (S507).

Next, the network device 200 determines whether the the BE is greater than a predetermined maximum value (S509). If the BE is not greater than the maximum value, the network device 200 repeats step S503.

In contrast, if the BE is greater than the maximum value, the network device 200 failed in transmitting the packets. The increase of the BE is restricted to a predetermined value. Though, the BE can be configured to increase infinitely.

Figure 6A:
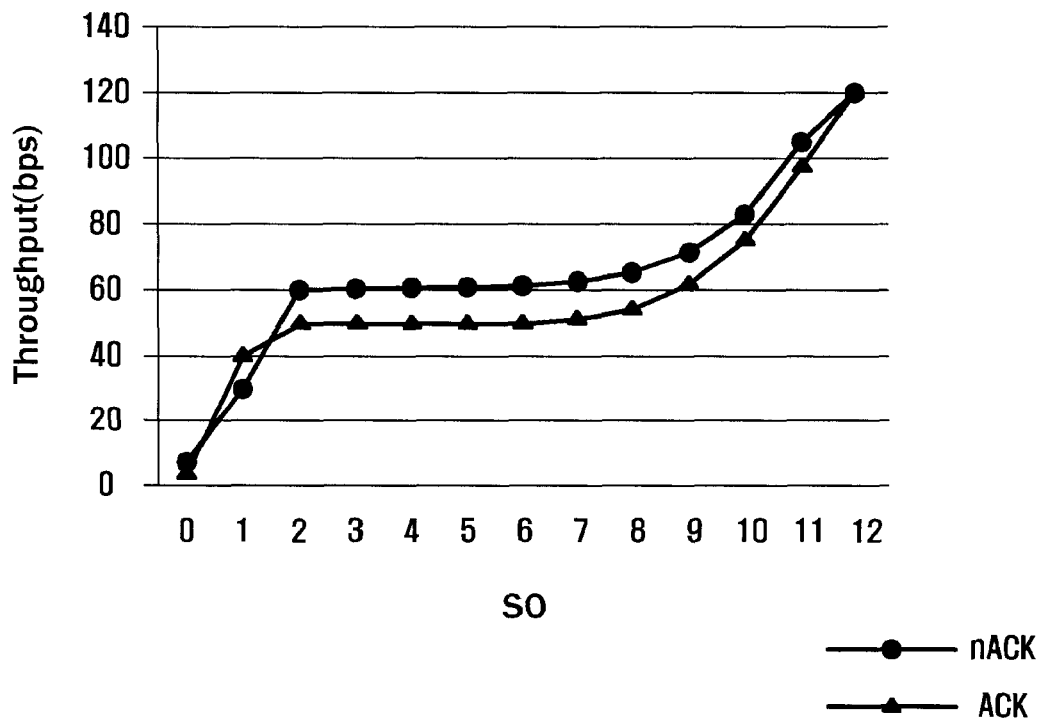
FIG. 6A is a graph illustrating a simulation result showing network throughput of a conventional packet transmission method.
Figure 6B:
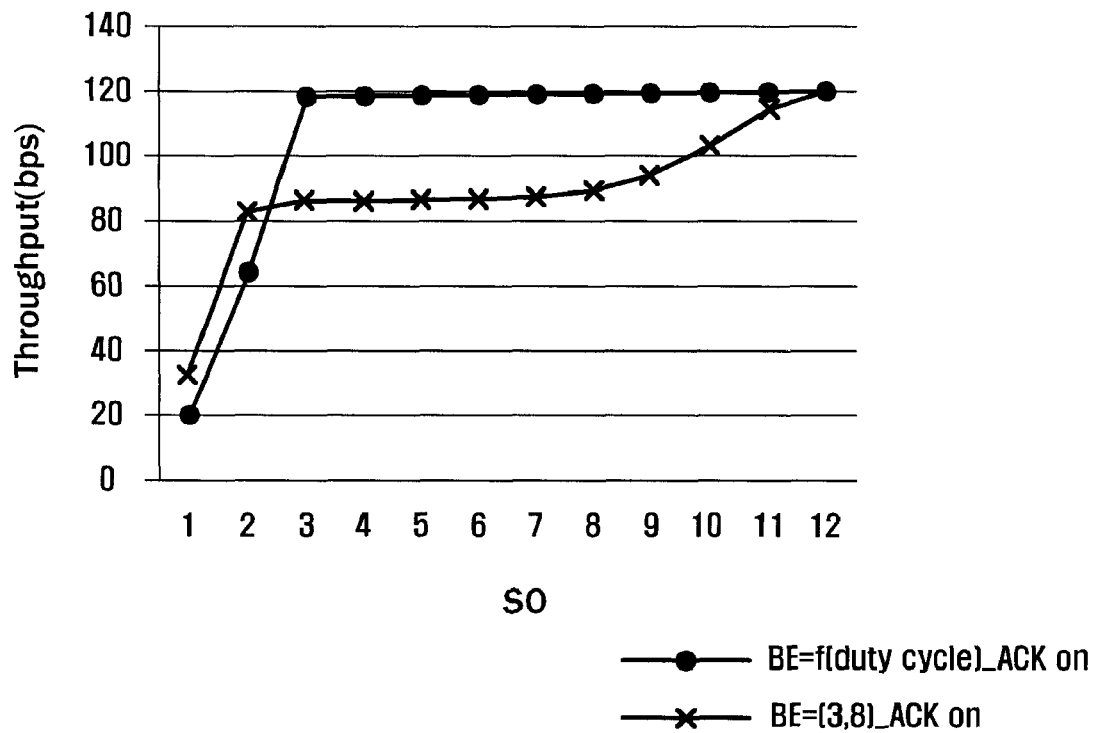
FIGS. 6B and 6C are graphs illustrating simulation results showing network throughput of a packet transmission method according to an exemplary embodiment of the present invention.
Figure 6C:
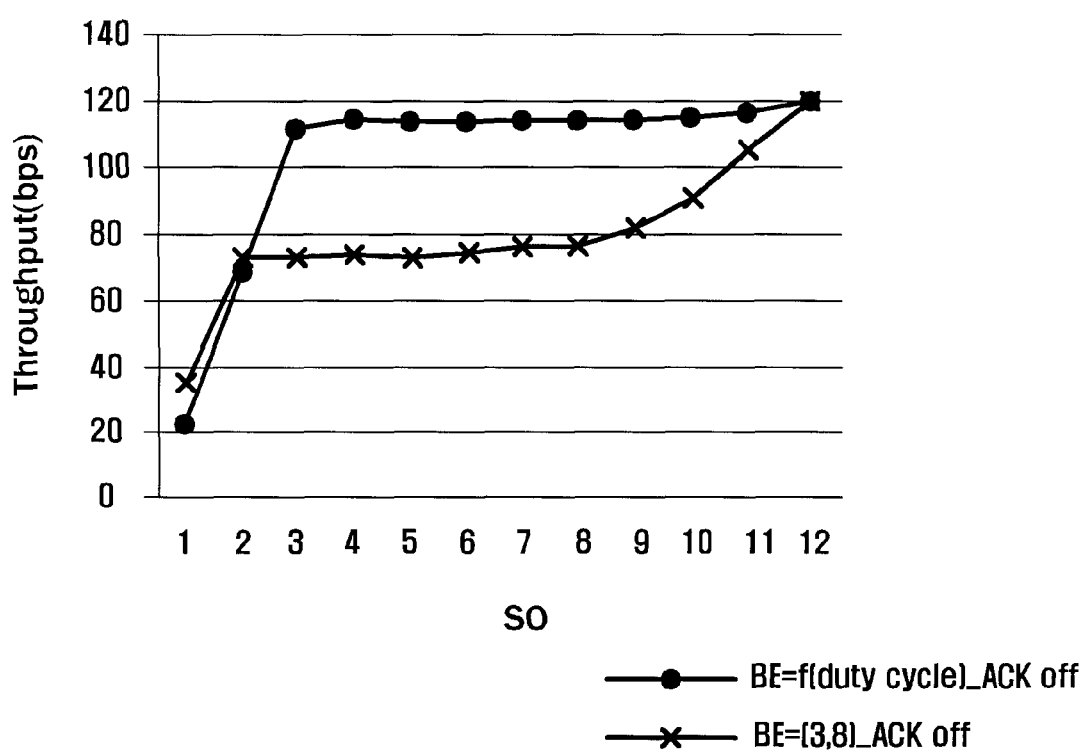

Now, the efficiency of the backoff mechanism of the packet transmission method according to this exemplary embodiment is described. FIG. 6A is a graph illustrating a simulation result showing network throughput of a conventional packet transmission method, and FIGS. 6B and 6C are graphs illustrating simulation results showing network throughput of a packet transmission method according to an exemplary embodiment of the present invention.

In FIG. 6A, the network throughput in a conventional process has been measured while varying the Superframe Order (SO in the graph) from 0 to 12, with the Beacon Order (BO) fixed to 12 (BO=12). The throughput simulation has been done in the network composed of a coordinator and 10 network devices, each generating traffic at 12 bps periodically. In this case, 100% throughput is 120 bps.

From FIG. 6A, it is shown that the throughput is less than 50% in most low duty cycles except when the duty cycle is 100% (SO=12). Here, the beacon is transmitted by the network coordinator and carries control information and message required for managing the network. The network coordinator broadcasts the beacon, and the network devices prepare transmission and reception of the packets using timeslots following the beacon on the basis of the control information and messages. The superframe is the time duration between two consecutive beacons. The superframe is composed of an active period in which the beacon frame is transmitted by the network coordinator and packets are transmitted and received, and an inactive period in which the network coordinator goes to a power save mode.

In the drawings, noACK (no acknowledgement) is a message indicating that the packet transmission fails, and ACK (acknowledgement) is a message indicating that the packet transmission succeeds. The ACK mechanism is more efficient that the noACK mechanism, since the ACK mechanism retransmits the lost packet.

FIGS. 6B and 6C show simulation results of the packet transmission method of the present invention when the network operates with ACK mechanism and noACK mechanism, respectively.

In comparison with the throughput of the conventional process in FIG. 6A, FIGS. 6B and 6C shows that the packet transmission method of the preset invention improves the network throughput dramatically.

Figure 7:
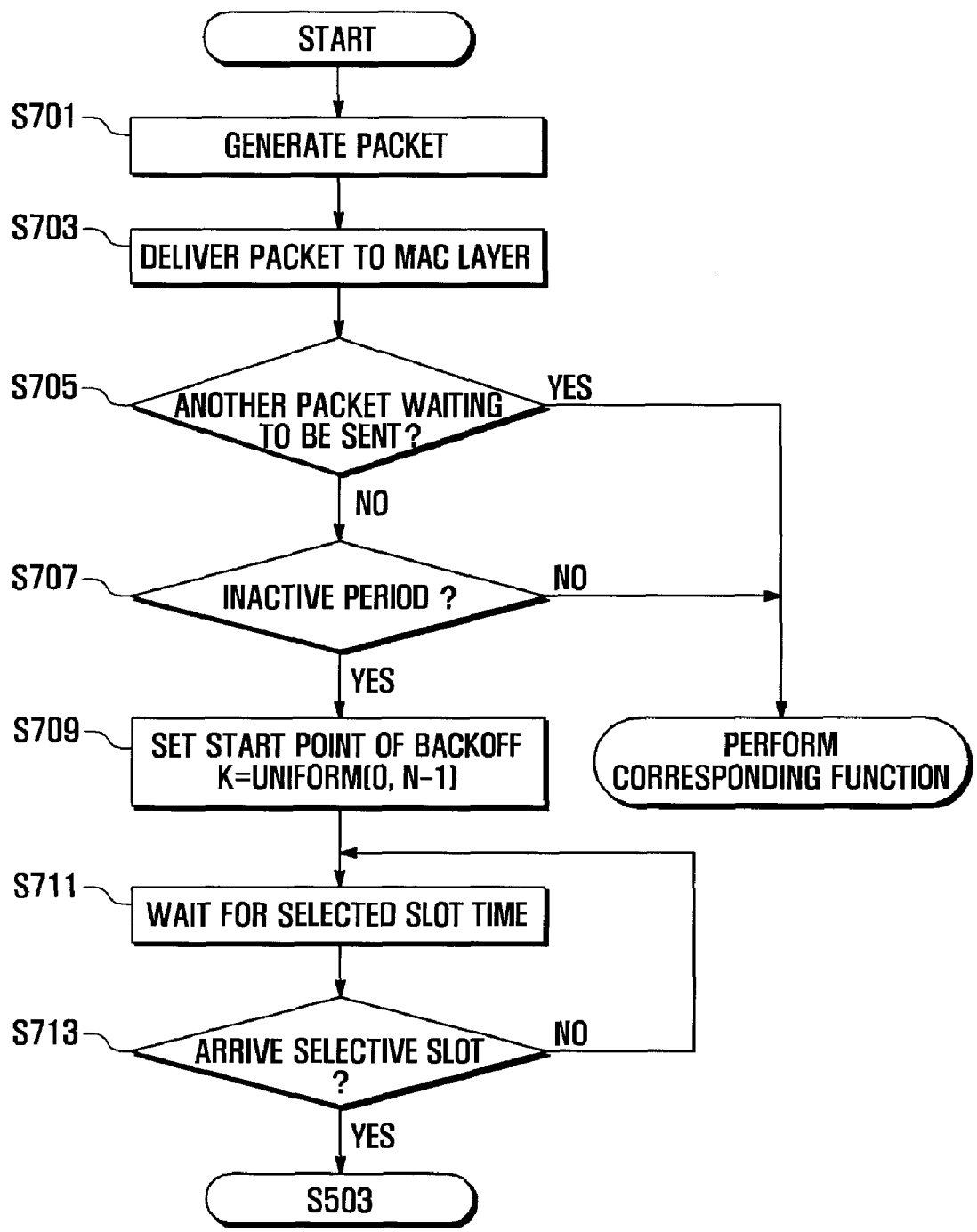
FIG. 7 is a flowchart illustrating an exemplary operation of a packet transmission method for a WPAN according to another exemplary embodiment of the present invention.

FIG. 7 is a flowchart illustrating a packet transmission method for a WPAN according to another exemplary embodiment of the present invention.

Referring to FIG. 7, in the packet transmission method according to this exemplary embodiment, a packet is generated at an upper layer of the network device 200 (S701) and then delivered to a medium access control (MAC) layer (S703).

If the packet is delivered to the MAC layer, the network device determines whether there is another packet waiting to be sent (S705). If it is informed that there are no other packets waiting to be sent, the network device 200 determines whether the network is in the inactive period (S707). If the network is in the inactive period, the network device 200 waits until the active period starts.

When the active period starts, the network device 200 sets a start time of a backoff (S709). At this time, the network device 200 selects a random value (n) in uniform distribution of (0, n−1). Here, n is a number of slots constituting the active period. That is, the active period is divided into n slots, and one of n slots is selected. Accordingly, the slot selection can be expressed as K=uniform (0, n−1), wherein K is a sample value of the uniform distribution.

Next, the network device 200 waits for the start time of the selected slot (S711) and determines whether the slot time has started (S713). If the slot time starts, the network device 200 performs a backoff as described at step S503 of FIG. 5. That is, the network device 200 backs off during the backoff time indicated by N. This process is performed in two steps, the first step for selecting a slot during the active period and the second step for performing the backoff at the start time of the selected slot in normal backoff manner.

Figure 8A:
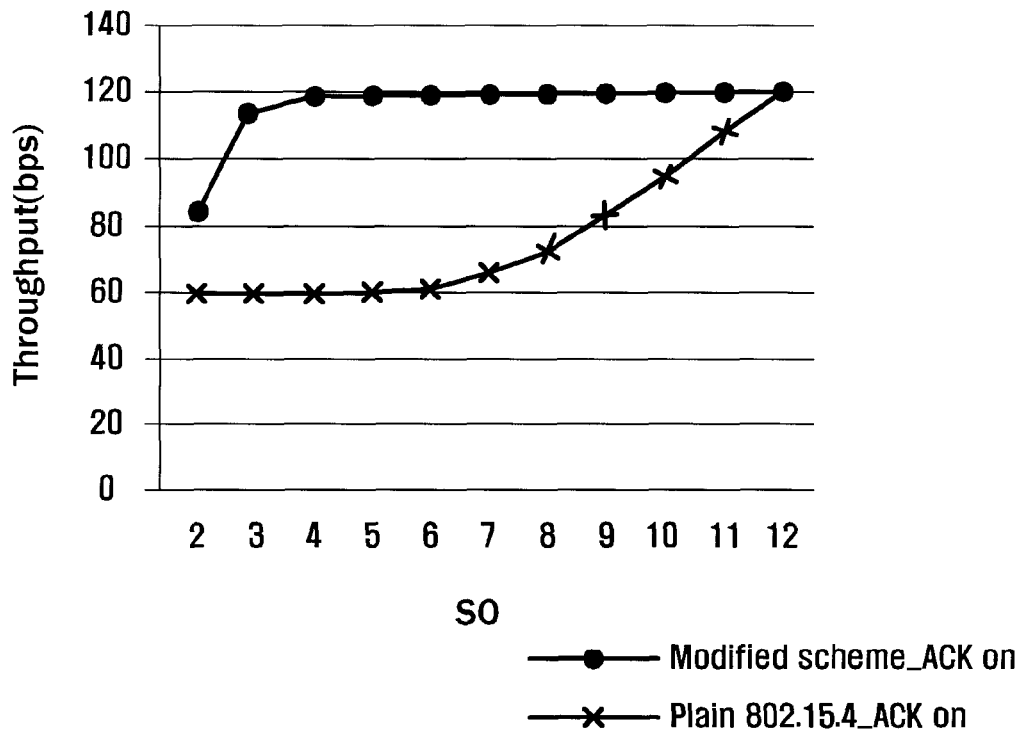
FIG. 8A shows variation of network throughput when the network operates with ACK mechanism.
Figure 8B:
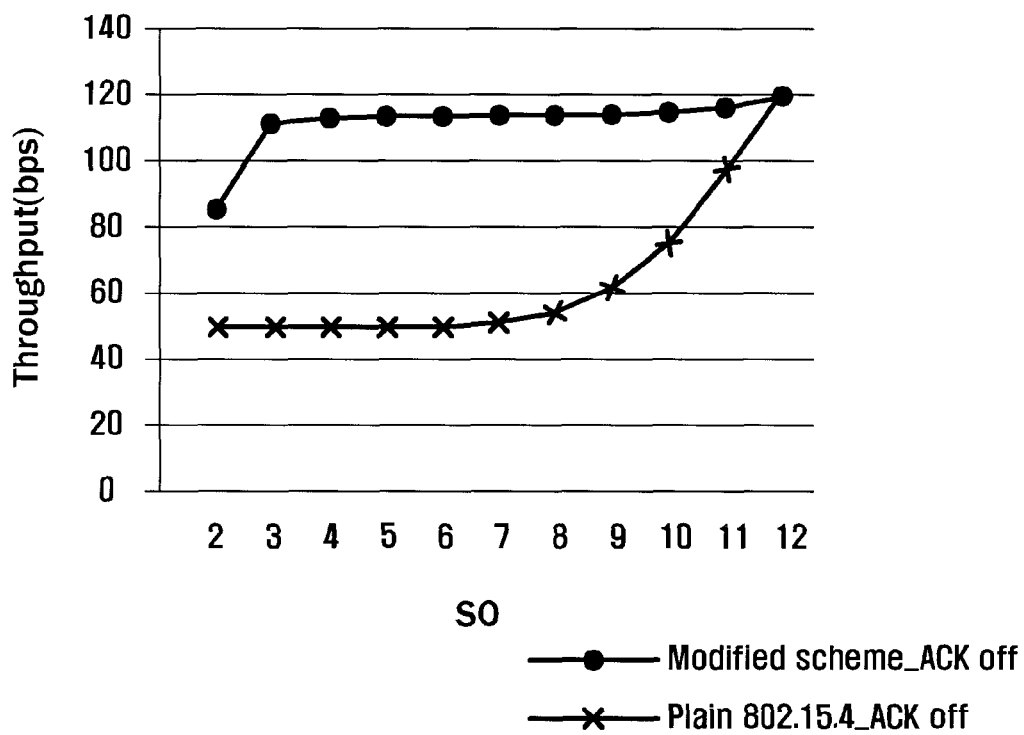
FIG. 8B shows variation of network throughput when the network operates with noACK mechanism.

Now, the efficiency of the backoff mechanism of the packet transmission method according to this exemplary embodiment is described, FIGS. 8A and 8B are graphs illustrating simulation results showing network throughputs of the packet transmission method according to an exemplary embodiment of the present invention.

FIG. 8A shows variation of network throughput when the network operates with ACK mechanism, and FIG. 8B shows variation of network throughput when the network operates with noACK mechanism. In comparison with the FIG. 6A, FIGS. 8A and 8B shows that the packet transmission method of the preset invention improves the network throughput dramatically.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the packet transmission method for a wireless personal area network according to the present invention controls an initial backoff value adaptively to a duty cycle of the network, thereby improving packet transmission efficiency and power conservation.

Also, the packet transmission method of the present invention can reduce packet loss caused by collision and transmission delay cause by increased backoff time particularly in a network using a low duty cycle, resulting in alleviation of traffic concentration and improvement of network throughput.

What is claimed is:

1. A packet transmission method for a wireless personal area network including a coordinator operating with a specific duty cycle between active periods and inactive, power save periods, the network including a plurality of devices, the method comprising:
    (a) determining, when a packet is generated in an inactive period, whether there is another packet waiting to be sent;
    (b) setting, if another packet is waiting to be sent in the inactive period, a backoff time using a binary exponential algorithm, to a value selected randomly in a uniform distribution;
    (c) setting, if the network is in an active period, the backoff time using the binary exponential backoff algorithm, to the value selected randomly in the uniform distribution;
    (d) setting, when the network is in the inactive period and no other packet is waiting to be sent, the backoff time to an exponential backoff value determined according to a duty cycle reduction function in which the exponential backoff value decreases from a maximum value to a minimum value as a function of increasing duty cycle between the active periods and inactive, power save periods; and
    (e) sending the packet when the backoff time has expired.

2. The packet transmission method of claim 1, wherein the exponential backoff value decreases linearly from the maximum value to the minimum value as a function of the increasing duty cycle.

3. The packet transmission method of claim 1, wherein the binary exponential backoff algorithm sets the backoff time to a value selected randomly in a uniform distribution of (0, $2^{BE}-1$).

4. The packet transmission method of claim 3, further comprising after expiration of the backoff time when transmission of the packet fails, increasing the exponential backoff value for a subsequent period.

5. The packet transmission method of claim 4, wherein the exponential backoff value for a subsequent period is doubled.

6. The packet transmission method of claim 4, wherein when the exponential backoff value is greater than a predetermined maximal value, the exponential backoff value is set to the predetermined maximal value.

7. The packet transmission method of claim 3, wherein the exponential backoff value comprises a default value.

8. A packet transmission method for a wireless personal area network including a coordinator operating with a specific duty cycle and a plurality of devices, comprising:
    (a) determining, when a packet is generated upon start of an active period, whether there is another packet waiting to be sent;
    (b) selecting, if it is determined in step (a) that no other packet is waiting to be sent, one of n slots constituting the active period in a uniform distribution of (0, n−1);
    (c) setting a start time of the slot selected in step (b) as a backoff start time
    (d) selecting a random value in a uniform distribution of (0, $2^{BE}-1$) when starting the backoff at the selected slot time; and
    (e) performing the backoff during the time corresponding to the selected random value.

9. A packet transmission method for a wireless personal area network including a coordinator and a plurality of devices, the coordinator operating with a specific duty cycle between active periods and inactive, power save periods, and the method comprising: determining, when a packet is generated, whether there is another packet waiting to be sent; if another packet is waiting to be sent, setting a backoff time to a default value; if no other packet is waiting to be sent, setting the backoff time to an exponential backoff value using a duty cycle reduction function in which the exponential backoff value decreases from a maximum value to a minimum value as a function of increasing duty cycle between the active periods and inactive, power save periods; and transmitting the packet when the backoff time expires.

10. The packet transmission method of claim 9, wherein the exponential backoff value is greater than the default value.

11. The packet transmission method of claim 9, wherein the default value is determined using a binary exponential backoff algorithm.

12. The packet transmission method of claim 11, wherein the binary exponential backoff algorithm sets the backoff time to a value selected randomly in a uniform distribution of (0, $2^{BE}-1$).

13. The packet transmission method of claim 12, further comprising, after expiration of the backoff time when transmission of the packet fails, increasing the exponential backoff value for a subsequent period.

* * * * *